3,654,313
2-OXONAPHTHO-(2,1-b)-FURAN-6-α-CARBOXYLIC
ACID DERIVATIVES
Howard Jones, Holmdel, N.J., assignor to Merck & Co.,
Inc., Rahway, N.J.
No Drawing. Filed Aug. 19, 1970, Ser. No. 65,320
Int. Cl. C07d 5/34
U.S. Cl. 260—343.3                    2 Claims

ABSTRACT OF THE DISCLOSURE 2-oxonaphtho(2,1-b)furan-6-α-carboxylic acid derivatives useful as anti-inflammatory agents.

---

This invention relates to new chemical compounds. More specifically, this invention relates to new naphthoic acid derivatives having the following general formula:

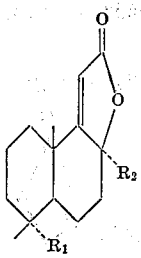

I wherein $R_1$ may be hydrogen, methyl, formyl, carboxy or hydroxymethyl and $R_2$ may be hydrogen or hydroperoxy.

The hydroperoxide compounds of this invention may be prepared by treating podocarpic acid to form the desired substituent and isolating the hydroperoxide from the ozonolysis reaction solution. When $R_2$ is hydrogen the product is obtained by reducing the hydroperoxide.

The compounds of this invention are useful in the treatment of inflammation. It is believed that the anti-inflammatory activity of these compounds is due to the inhibition of complement, a group of nine serum proteins which act sequentially to produce cell destruction and to generate inflammation.

This invention also relates to a method of treating pain, fever or inflammation in patients (animal or human) using a compound of Formula I.

The treatment of inflammation in accordance with the method of the present invention is accomplished by topically, orally, rectally or parenterally administering to patients a composition of a compound of Formula I in a non-toxic pharmaceutically acceptable carrier.

The non-toxic pharmaceutical carrier may be, for example, either a solid or a liquid. Exemplary of solid carriers are lactose, corn starch, gelatin, talc, Sterotix, stearic acid, magnesium stearate, terra alba, sucrose, agar, pectin, Cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol.

Gels and lotions for topical application may be prepared in conventional manner.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 50 mg. to 750 mg. per kg. body weight per day, preferably from about 250 mg. to 500 mg./kg. body weight per day.

The method of treatment of this invention comprises administering to a patient (animal or human), a compound of Formula I admixed with a non-toxic pharmaceutical carrier such as exemplified above. The compounds of Formula I will be administered in an amount of from 50 mg. to 750 mg./kg. body weight per day, preferably from about 250 mg. to about 500 mg. per kilogram body weight per day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The following examples are presented to further illustrate the invention:

EXAMPLE 1

2,3a,4,5,5a,6,7,8,9,9a-decahydro - 3a - hydroperoxy-6β,9a-dimethyl - 2 - oxonaphtho-[2,1-b]-furan-6-α-carboxylic acid and 2,3a,4,5,5a,6,7,8,9,9a-decahydro-6β,9a-dimethyl-2-oxonaphtho-[2,1-b]-furan-6-α-carboxylic acid Podocarpic acid (5.0 g.) is ozonized at −85° in methanol with 8.5–8.75 p.s.i. pressure of oxygen 0.25 ml./sec. flow rate, and 90 volt arc. The product is poured into a solution consisting of 70 ml. Chlorox, 300 ml. ice-cold water, 100 ml. methanol, 200 g. ice and 10 ml. concentrated hydrochloric acid. The solution is stirred for 20 minutes and extracted with chloroform (3× 400 ml.). The chloroform solution is dried over magnesium sulphate and evaporated to near dryness.

The hydroperoxide acid is isolated directly by the careful evaporation of the solvent, and is recrystallized from ethyl acetate to yield 2,3a,4,5,5a,6,7,8,9,9a-decahydro-3a-hydroperoxy - 6β,9a - dimethyl - 2 - oxonaphtho[2,1-b]-furan-6-α-carboxylic acid, M.P. 202–204°.

The acid lactone is isolated by reducing the crude hydroperoxide (1.0 g.) with sodium borohydride (1.2 g.) to yield 2,3a,4,5,5a,6,7,8,9,9a - decahydro - 6β,9a - dimethyl-2 - oxonaphtho - [2,1-b]-furan-6-α-carboxylic acid, M.P. 208–209°.

EXAMPLE 2

2,3a,4,5,5a,6,7,8,9,9a-decahydro - 3a - hydroperoxy-6β-9a-dimethyl - 2 - oxonaphtho - [2,1-b]-furan-6-α-methanol and 2,3a,4,5,5a,6,7,8,9,9a - decahydro-6β,9a-dimethyl-2-oxonaphtho-[2,1-b]-furan-6-α-methanol Podocarpic acid (4 g.) is dissolved in absolute alcohol (40 ml.) and concentrated sulphuric acid is added (0.5 ml.). The mixture is refluxed for five hours and evaporated to a volume of 10 ml. The reaction mixture is poured into water (200 ml.) and the methyl podocarpate which is precipitated is filtered off.

Methyl podocarpate (2 g.) in tetrahydrofuran is reduced with lithium aluminum hydride (0.5 g.) at 0° with stirring. After one hour the solution is poured into water and 1,4a-dimethyl-1-hydroxymethyl-6-hydroxy-1,2,3,4,4a, 9,10,10a-octahydrophenanthrene is extracted with ethyl acetate (2× 300 ml.). The ethyl acetate solution is dried over anhydrous magnesium sulphate, filtered and the filtrate is evaporated to dryness. This compound is ozonized and isolated by the procedure of Example 1 to give the hydroperoxide. The hydroperoxide is isolated directly by careful evaporation of the solvent and is recrystallized from ethyl acetate to yield 2,3a,4,5,5a,6,7,8,9,9a-decahydro-3a-hydroperoxy - 6β,9a - dimethyl - 2 - oxonaphtho-[2,1-b]-furan-6-α-methanol.

The lactone is isolated by reducing the crude hydroperoxide (0.5 g.) with sodium borohydride (0.6 g.) to yield 2,3a,4,5,5a,6,7,8,9,9a - decahydro - 6β,9a - dimethyl - 2-oxonaphtho-[2,1-b]-furan-6-α-methanol.

EXAMPLE 3

2,3a,4,5,5a,6,7,8,9,9a - decahydro - 3a - hydroperoxy-6β, 9a - dimethyl - 2 - oxonaphtho-[2,1-b]-furan-6-α-carboxaldehyde and 2,3a,4,5,5a,6,7,8,9,9a - decahydro-6β, 9a-dimethyl - 2 - oxonaphtho[2,1-b]-furan-6-carboxaldehyde 1,4a - dimethyl - 1 - hydroxymethyl - b - hydroxy-1,2,3,4,4a,9,10,10a - octahydrophenanthrene (1.0 g.) is oxidized with chromic oxide (0.5 g.) in glacial acetic acid (20 ml.) at 50° over three hours and then evaporated to 5 ml. The solution is poured into ice-water and the precipitated 1,4a - dimethyl - 6 - hydroxy-1,2,3,4,4a,9,10,10a-octahydrophenanthrene-1-carboxaldehyde (0.84 g.) is collected and dried.

This aldehyde (0.84 g.) is then ozonized and worked up by the procedure of Example 1 to give the hydroperoxide isolated directly by careful evaporation of the solvent and is recrystallized from ethyl acetate to yield 2,3a,4,5,5a,6, 7,8,9,9a - decahydro - 3a - hydroperoxy-6β,9a-dimethyl-2-oxonaphtho-[2,1-b]-furan-6-α-carboxaldehyde.

EXAMPLE 4

2,3a,4,5,5a,6,7,8,9,9a - decahydro - 3a - hydroperoxy-6α, 6β,9a - trimethyl - 2 - oxonaphtho-[2,1-b]-furan and 2,3a,4,5,5a,6,7,8,9,9a - decahydro - 6α,6β,9a - trimethyl-2-oxonaphtho-[2,1-b]-furan 1,4a - dimethyl - 6 - hydroxy - 1,2,3,4,4a,9,10,10a-octahydrophenanthrene-1-carboxaldehyde (1.0 g.) is refluxed in concentrated hydrochloric acid (50 ml.) with amalgamated zinc metal (4 g.) for eight hours and then filtered cold. The residue is washed with ethylacetate and combined washings and filtrates separated. The ethyl acetate is dried and evaporated to give 0.8 g. of 1,1a,4a-trimethyl-6-hydroxy-1,2,3,4,4a,9,10,10a-octahydrophenanthrene.

This hydrocarbon is then ozonized and worked up by the procedure of Example 1 to give the hydroperoxide isolated directly by careful evaporation of the solvent and is recrystallized from ethyl acetate to yield 2,3a,4,5,5a,6,7,8, 9,9a - decahydro - 3α - hydroperoxy - 6α,6β,9a - trimethyl-2-oxonaphtho-[2,1-b]-furan.

The lactone is isolated by reducing the crude hydroperoxide with sodium borohydride to yield 2,3a,4,5,5a,6,7,8, 9,9a - decahydro - 6α,6β - 9a - trimethyl-2-oxonaphtho-[2,1-b]-furan.

EXAMPLE 5

2,3a,4,5,5a,6,7,8,9,9a - decahydro - 3a - hydroperoxy-6β, 9a-dimethyl - 2 - oxonaphtho-[2,1-b]-furan and 2,3a,4, 5,5a,6,7,8,9,9a - decahydro - 6β,9a - dimethyl - 2 - oxonaphtho-[2,1-b]-furan Podocarpic acid (20 g.) is dry distilled under 10 to 20 mm. pressure and carbon dioxide is given off. One fraction is ozonized and worked up as in Example 1 above.

The hydroperoxide is isolated by careful evaporation of the sovent and is recrystallized from ethyl acetate to yield 2,3a,4,5,5a,6,7,8,9,9a - decahydro - 3a - hydroperoxy-6β, 9a-dimethyl-2-oxonaphtho-[2,1-b]-furan.

The lactone is isolated by reducing the crude hydroperoxide with sodium borohydride to yield 2,3a,4,5,5a,6,7,8, 9,9a - decahydro - 6β,9a - dimethyl - 2 - oxonaphtho-[2,1-b]-furan.

What is claimed is:
1. A compound of the formula

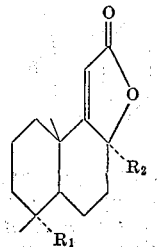

wherein $R_1$ may be hydrogen, methyl, formyl, carboxy or hydroxymethyl and $R_2$ may be hydrogen or hydroperoxy.

2. A compound as in claim 1 wherein $R_1$ is carboxy.

References Cited

Edouard Demole et al., Helv. Chim. Octa 50 (5), 1313–1327, 1967.

ALEX MAZEL, Primary Examiner

A. T. TIGHE, Assistant Examiner

U.S. Cl. X.R.

424—279